United States Patent Office 2,977,220
Patented Mar. 28, 1961

2,977,220
PROCESS OF PRODUCING URANIUM

Thomas Kenneth Wood, deceased, Runcorn, England, by Cissie Wood, executrix, Runcorn, England, assignor, by mesne assignments, to the United States of America as represented by the United States Atomic Energy Commission No Drawing. Filed Sept. 28, 1944, Ser. No. 556,292

7 Claims. (Cl. 75—84.1)

This invention relates to improvements in the production of uranium.

In British Patent No. 804,063 there is described a process for the production of uranium in which substantially anhydrous uranium tetrafluoride is reacted with an alkali metal, an alkaline earth metal (including magnesium) or with a mixture or alloy of such metals. It was stated that the reactants could be mixed in a powdered or comminuted form, and in one method of carrying out the invention, powdered uranium tetrafluoride was mixed with an excess of calcium turnings. The mixture was heated until reaction commenced, reaction then proceeded exothermically, and terminated in a relatively short time.

In carrying out this process by reacting substantially anhydrous uranium tetrafluoride with calcium turnings in a deep open vessel it has been found that substantial and hitherto unpredictable variations have occurred between the yields and quality of uranium obtained in successive batches, and in the smoothness and completeness of the reaction. With some batches a comparatively slow reaction would occur and the yield and quality of the uranium would be unsatisfactory, while with other batches reaction would occur with explosive violence, and a substantial proportion of the reaction mixture would be lost. As a result of further investigation of the process it now appears that the yield and quality of the uranium produced are related to the speed of reaction, which is in turn related to the thickness of the turnings, and to their packing density, which latter itself depends inter alia on the length of the turnings. With too small or too large a packing density, segregation of the tetrafluoride from the turnings occurs when a charge of the mixed reactants is put into the reaction vessel, and as a result reaction does not go to completion, so that the yield and also the quality of the product are unsatisfactory. If the thickness of the turnings is too great so that the heat capacity of each portion is large with respect to its surface area, reaction is slow, and poor separation of metal and slag results. If the turnings are to thin, reaction may be so violent that part of the reaction mixture is ejected.

It has now been found that in the production of uranium by the method of the aforesaid copending application in which uranium is prepared by reacting substantially anhydrous uranium tetrafluoride in finely divided form with excess calcium in a comparatively deep open vessel, it is necessary for satisfactory production that the calcium should be in the form of small plate-like pieces, such as turnings or planings, of thickness of the order of $\frac{1}{32}$ to $\frac{1}{80}$ inch and should have a packing density such that the free space between the pieces is substantially equal to the volume occupied by the uranium tetrafluoride. By the volume occupied by the uranium tetrafluoride is meant the volume of the powdered material including the air spaces as distinct from the figure given by the ratio of the mass to the true density.

According to the present invention, therefore, a process for the production of uranium in a massive form by heating to reaction temperature in a deep open vessel a mixture of finely divided substantially anhydrous uranium tetrafluoride and calcium is characterised in that the calcium is in the form of small plate-like pieces suitably of thickness of the order of $\frac{1}{32}$ to $\frac{1}{80}$ inch, and has a packing density such that the free space between the pieces of calcium is substantially equal to the volume occupied by the uranium tetrafluoride.

Suitably, the calcium is in the form of turnings of the specified thickness and between $\frac{1}{2}''$ and $1''$ in length. Turnings meeting these requirements and being $\frac{1}{4}''$ to $\frac{1}{2}''$ wide have a suitable packing density. They may be made, for example, by turning from an ingot using a breaking tool so that the individual pieces have the correct length, or they may be produced without a breaking tool, and the resulting comparatively long helical pieces can be broken up in a ball mill, or otherwise, until metal with a suitable packing density results. This can be done without any special precautions to exclude air during the turning or the tumbling. In view of the desirability of avoiding the presence of inert bodies which would diminish the temperature reached and the speed of reaction it is preferable to use good quality metal, i.e. metal containing at least 92% free calcium.

A suitable proportion of calcium to uranium tetrafluoride to employ is between 3.0 and 4.0 gram atoms of calcium to each gram mol of the tetrafluoride, for example between 3.5 and 4.0 gram atoms per gram mol, while the uranium tetrafluoride in the powdered form which is conveniently used has a packing density of approximately 1.5 grams/cc.; hence it can be calculated that a suitable packing density for the calcium which gives the necessary free space is a packing density of approximately 0.5 gram/cc. A somewhat larger or smaller excess of calcium may be used and some variation in the packing density of the uranium tetrafluoride may occur, for example, it may be as high as 2.0 grams/cc. although in practice it never approaches the true density of 6.95 grams/cc. Variations in either of these factors will cause variation in the optimum packing density of the calcium. Thus, using 4.5 gram atoms of calcium per gram mole of uranium tetrafluoride of packing density 2.0 grams/cc., the optimum packing density for the calcium turnings would be 0.65 gram/cc.

By choosing turnings or planings meeting these requirements as regards thickness and packing density, no segregation of the tetrafluoride occurs, and the fluoride and calcium remain intermixed when a mixture of the two is charged into the reaction vessel. However, the thickness of the calcium is such that reaction will on the one hand not be so violent that the reaction mixture is ejected, and on the other hand will be sufficiently rapid for the molten uranium metal produced to separate from the slag and form a massive billet. By selecting turnings or planings which are rather less than an inch in length, for example $\frac{1}{2}''$ or $1''$ in length, and of appropriate width, the free space is found to be approximately equal to, i.e. within $\pm 10\%$ of the volume of the tetrafluoride, and thus the calcium is in a satisfactory form.

No particular procedure or precautions are needed to determine the packing density; merely filling a container with turnings to a given predetermined level with a brief agitation during the filling and determining the weight so introduced gives a reproducible value for the packing density from which the free space can be deduced.

The method of initiating the reaction and isolating the recovered metal may be carried out as described in the above numbered British Patent No. 804,063, i.e. the calcium of suitable packing density and the substantially anhydrous uranium tetrafluoride in powdered form are mixed, as for example by tumbling in a closed container, and the mixture is then charged into an open heat insulated vessel which is comparatively deep in proportion to its cross-section. Thus a vessel may be used shaped as an inverted frustrum of a cone, or as an inverted frustum having a square section, the height of the vessel being between 3 and 4 times the mean diameter or length of side respectively. Trough-shaped vessels may also be used which are much longer than they are wide, and which have a height between 3 and 4 times the mean width. However, much deeper vessels can be used and also shallower vessels. Conveniently the vessel has a well at the bottom to receive the molten metal which is produced.

The volume of the charge should not be such that it will completely fill the reaction vessel, and suitably it occupies between 60% and 70% of the reaction vessel, although larger charges occupying up to approximately 80% of the vessel may used. Suitably the vessel is lined with a suitable inert refractory material such as calcium fluoride. The production of a suitable vessel lined with calcium fluoride is described in British Patent No. 805,191 and does not constitute part of the present invention. After the charge has been put into the vessel reaction is initiated by playing a blow pipe flame on it or by equivalent means, such as by burying a wire in the reaction mixture and bringing it to a red heat by passing an electric current through it. Another method of initiating reaction which may be used is to place a fuse of black powder in the charge or to bury in the surface layers a mixture of the type used for initiating alumino-thermic reactions.

Any of the above methods will serve to bring that part of the reaction mixture in the immediate neighbourhood of the initiator to reaction temperature and reaction will then proceed exothermically and spread throughout the charge in a comparatively short time of the order of a few seconds. After reaction is complete the reaction products may be allowed to cool down, and it will then be found that a solid mass of uranium has collected at the bottom of the reaction vessel beneath a layer of slag. The metal can then be separated from the slag and, if desired, washed to remove any small amounts of slag which adhere to it. In general, however, this is not necessary, merely scraping the surface being sufficient.

Tht following example illustrates but does not limit the invention, all parts being by weight.

*Example*

Freshly cut turnings of good quality calcium having a thickness varying between $1/48''$ and $1/60''$ and width $1/4''$ to $1/2''$ were broken up in a ball mill until they had a packing density of substantially 0.5 gram/cc. 40.5 kilos of these turnings were mixed with 97 kilos of anhydrous uranium tetrafluoride of packing density 1.8 grams/cc.

The true density of calcium metal is 1.54, so it will be seen that the free space between the turnings was substantially equal to the volume occupied by the uranium tetrafluoride.

When the two reactants had been mixed thoroughly the mixture was charged into a deep frustoconical iron container so lined with calcium fluoride that in the bottom portion was a well just large enough to receive the uranium which would be produced, and which was joined to the main space of the reaction vessel by an intermediate portion with steeply sloping sides. The reaction mixture occupied approximately $2/3$ of the volume of the vessel. In charging it into the vessel no segregation had occurred, as was evidenced by the fact that the top layer still contained both constituents and was not merely a layer of either of them. To initiate the reaction a fine wire was buried in the charge and made red hot by passing an electric current through it. A vigorous reaction set in with the evolution of heat and light which persisted for between 4 and 5 seconds. The vessel and contents were then allowed to cool and the uranium metal which had collected in the well of the vessel as a solid block was separated from the layer of slag above it and washed to remove slag which still adhered to it.

The block so obtained weighed 72 kilos, corresponding to a 98% yield on the uranium tetrafluoride. Analysis showed it to contain over 99% free uranium.

What is claimed is:

1. A process for the production of uranium in massive form by heating to reaction temperature in an open container deep in comparison with its cross section a mixture consisting of substantially anhydrous uranium tetrafluoride in finely divided form and calcium, characterised in that the calcium is in the form of small plate-like pieces of thickness between $1/32$ and $1/80$ inch, and has a packing density such that the free space between the pieces of calcium substantially equal to the volume of the uranium tetrafluoride.

2. A process according to claim 1 in which between 3 and 4 gram atoms of calcium is present in the reaction mixture for every gram mol of tetrafluoride.

3. A process for the production of uranium in massive form by heating to reaction temperature in an open container deep in comparison with its cross section a mixture consisting of substantially anhydrous uranium tetrafluoride and calcium characterised in that the calcium is in the form of turnings of length varying between $1/2''$ and $1''$, width varying between $1/4''$ and $1/2''$, and thickness between $1/32$ and $1/80$ inch, said calcium having a packing density such that the free space between the pieces of calcium is substantially equal to the volume of the uranium tetrafluoride.

4. A process according to claim 3 in which between 3 and 4 gram atoms of calcium is present in the reaction mixture for every gram mol of tetrafluoride.

5. In a process for the production of uranium in massive form the steps of mixing substantially anhydrous uranium tetrafluoride in a finely divided condition with calcium in the form of small plate-like pieces of thickness between $1/32$ and $1/80$ inch and of packing density such that the free space between the pieces of calcium is substantially equal to the volume of the uranium tetrafluoride, thereby causing the said finely divided uranium tetrafluoride to occupy the said free spaces, charging the said mixture in a container deep in comparison with its cross section, and initiating reaction between the components and the charge by heating a portion thereof until reaction is initiated.

6. A process according to claim 5 in which between 3 and 4 gram atoms of calcium is present in the reaction mixture for every gram mol of tetrafluoride.

7. A process for the production of uranium in massive form, which comprises mixing substantially anhydrous uranium tetrafluoride in a finely divided form with calcium in the form of turnings of length varying between $1/2'$ and $1''$, width varying between $1/4''$ and $1/2''$, and the thickness varying between $1/32$ and $1/80$ inch, the amount of uranium tetrafluoride being such that it just suffices to occupy substantially all of the free space between the turnings thereby causing the said uranium tetrafluoride to occupy the said free space, charging the said mixture into a container deep in comparison with its cross section, and causing reaction between the components and the charge to take place by locally heating a portion of the said charge until reaction is initiated.

References Cited in the file of this patent

UNITED STATES PATENTS

| | | |
|---|---|---|
| 1,111,698 | Liebmann | Sept. 22, 1914 |
| 1,088,909 | Kuzel et al. | Mar. 3, 1914 |

FOREIGN PATENTS

| | | |
|---|---|---|
| 230,865 | Great Britain | Dec. 10, 1925 |

OTHER REFERENCES

Materials of Construction, 5th edition, Withers et al., pages 409, 410, 414, 416, 428 and 429, 1919. Copy in Division 25 of the Patent Office.